United States Patent
Yang

(10) Patent No.: US 11,484,130 B2
(45) Date of Patent: Nov. 1, 2022

(54) LIFTING DEVICE FOR PLAYARD

(71) Applicant: ZHONGTONG (XIAMEN) CHILDREN PRODUCTS CO., LTD., Xiamen (CN)

(72) Inventor: Jianbo Yang, Xiamen (CN)

(73) Assignee: ZHONGTONG (XIAMEN) CHILDREN PRODUCTS CO., LTD., Xiamen (CN)

( * ) Notice: Subject to any disclaimer, the term of this patent is extended or adjusted under 35 U.S.C. 154(b) by 253 days.

(21) Appl. No.: 16/997,950

(22) Filed: Aug. 20, 2020

(65) Prior Publication Data
US 2021/0153667 A1    May 27, 2021

(30) Foreign Application Priority Data

Nov. 23, 2019 (CN) .......................... 201922040694.2

(51) Int. Cl.
| | | |
|---|---|---|
| A47D 13/06 | (2006.01) | |
| F16M 11/24 | (2006.01) | |
| E05B 65/00 | (2006.01) | |

(52) U.S. Cl.
CPC ........ *A47D 13/068* (2013.01); *E05B 65/0007* (2013.01); *E05B 65/0014* (2013.01); *F16M 11/24* (2013.01)

(58) Field of Classification Search
CPC .............. A47D 13/068; E05B 65/0007; E05B 65/0014; F16M 11/24
See application file for complete search history.

(56) References Cited

U.S. PATENT DOCUMENTS

| | | | | |
|---|---|---|---|---|
| 5,442,881 | A * | 8/1995 | Asbach | E05B 65/0007 49/55 |
| 9,464,467 | B1 * | 10/2016 | Flannery | E05B 65/0007 |
| 10,590,680 | B2 * | 3/2020 | Mizner | E05B 65/5292 |
| 11,041,340 | B1 * | 6/2021 | Flannery | E05C 1/16 |
| 11,162,300 | B1 * | 11/2021 | Flannery | E05C 3/167 |
| 2006/0207180 | A1 * | 9/2006 | Cheng | E05B 65/0014 49/57 |
| 2009/0013604 | A1 * | 1/2009 | Yates | E05B 65/0014 49/506 |
| 2011/0193354 | A1 * | 8/2011 | Simmonds | E05C 19/163 292/341.18 |
| 2014/0225383 | A1 * | 8/2014 | Simmonds | E05C 1/04 292/238 |

(Continued)

*Primary Examiner* — Mark A Williams
(74) *Attorney, Agent, or Firm* — Bayramoglu Law Offices LLC

(57) ABSTRACT

A lifting device for a playard includes a slide rail and a connector. A slide groove is provided on a left side of the slide rail. A slide portion cooperating with the slide groove is provided on a right side of the connector. A movable part capable of left-right movement is provided in the connector. The movable part is translationally connected with a pulling member. An upper part of the pulling member is hinged with the connector. A positioning post is fixed on a right end surface of the movable part. A positioning hole is provided on the right side of the connector. A plurality of limiting holes are provided on the left side of the slide rail. A front end surface of the pulling member is provided with a post hole extending backward. The post hole is provided therein with a pressing post adapted to the post hole.

3 Claims, 8 Drawing Sheets

(56) References Cited

U.S. PATENT DOCUMENTS

| | | | |
|---|---|---|---|
| 2016/0060924 A1* | 3/2016 | Singh .................... | E05C 19/163 |
| | | | 292/251.5 |
| 2018/0094466 A1* | 4/2018 | Schneider ............. | E05B 47/004 |
| 2020/0386049 A1* | 12/2020 | Kaiser ...................... | E06B 9/04 |
| 2022/0178182 A1* | 6/2022 | Talpe .................. | E05B 65/0007 |

* cited by examiner

LIFTING DEVICE FOR PLAYARD

CROSS REFERENCE TO THE RELATED APPLICATIONS

This application is based upon and claims priority to Chinese Patent Application No. 201922040694.2, filed on Nov. 23, 2019, the entire contents of which are incorporated herein by reference.

TECHNICAL FIELD

The invention relates to children's products, and more particularly, to a lifting device for a playard.

BACKGROUND

The playard is mainly composed of a frame body and enclosures. The enclosures provide a safe space for a child to play, which can prevent the child from climbing out and falling. The existing frame body is mainly composed of a bottom frame, standing posts, straight handrail tubes, arc handrail tubes and pivoting pieces. The standing posts, straight handrail tubes, arc handrail tubes and enclosures form a protective fence. Since the playard extends upward a distance that is difficult for small-statured caregivers to reach, it becomes challenging for the caregiver to comfortably lift and handle the child in or out of the enclosure. Prior playards have adopted a liftable straight handrail tube. The handrail tube is provided with pulling members on double ends, and can be lifted and lowered by pressing the pulling members. Because operation of the straight handrail tube is controlled by a single lock, however, children often press the pulling members by mistake or accident causing them to fall and the child released to the ground causing injury or death. It is therefore desirable to make a new lifting device for a playard that does not pose a risk of accidental injury or death to the child.

SUMMARY

In order to solve the problem that existing liftable playard devices can be tampered with by the child and may become unlocked and accidentally fall causing serious injury to the child, the present invention provides a new lifting device for a playard.

To solve the above technical problems, the new lifting device adopts the following technical solutions.

A lifting device for a playard includes a slide rail and a connector. A slide groove is provided on a left side of the slide rail. A slide portion cooperating with the slide groove is provided on a right side of the connector. The connector is provided therein with an elastic movable part which moves left and right relative to the connector. The movable part is in transmission connection with a pulling member. An upper part of the pulling member is hinged with the connector. A positioning post is fixed on a right end surface of the movable part. A positioning hole for the positioning post to pass through is provided on the right side of the connector. A plurality of upper and lower limiting holes are provided on the left side of the slide rail. A front end surface of the pulling member is provided with a post hole extending backward. The post hole is provided therein with an elastic pressing post adapted to the post hole. A front end of the pressing post extends out of the post hole. A top surface of the front end of the pressing post is provided with a baffle. A pressing portion is provided on the front end of the pressing post. The pressing portion is located on a front side of the baffle, and an outer diameter of the pressing portion is greater than an outer diameter of the pressing post. A bottom surface of a front end of the connector is provided with a downward extension plate. A bottom surface of the extension plate is adapted to the pressing portion to hold an upper part of the pressing portion. The baffle is located on a rear side of the extension plate and can abut against the extension plate.

Further, a sleeve is fixed in the connector. Front and rear parts of the sleeve are provided, respectively, with a front engagement and a rear engagement. The movable part is located in the sleeve. Inner top and bottom surfaces of the sleeve are each provided with a first limiting groove. Top and bottom surfaces of the movable part are provided with first limiting protrusions cooperating with the corresponding first limiting grooves. A left end surface of the movable part is provided with a first receiving cavity. A first return spring is provided between the first receiving cavity and a left inner side of the sleeve. Front and rear end surfaces of the movable part are respectively provided with a front stopper and a rear stopper. Right end surfaces of the front stopper and the rear stopper are first inclined surfaces inclined downward to the bottom left. The upper part of the pulling member is provided with a front pulling plate and a rear pulling plate. Top surfaces of the front pulling plate and the rear pulling plate are second inclined surfaces fitting with the first inclined surfaces. The top surfaces of the front pulling plate and the rear pulling plate can respectively abut against right end surfaces of the front engagement and the rear engagement. An insert plate is provided in the middle of a bottom surface of the sleeve. A slot for inserting the insert plate is provided in the middle of a top surface of the pulling member. The insert plate is located between the front pulling plate and the rear pulling plate. The front pulling plate and the rear pulling plate are provided with vertical grooves. The connector is provided with a hinged shaft, and the hinged shaft sequentially passes through the front end of the connector, the vertical groove of the front pulling plate, the insert plate, the vertical groove of the rear pulling plate and a rear end of the connector.

Further, a second limiting groove communicating with the post hole is provided above the post hole. A second limiting protrusion cooperating with the second limiting groove is provided on a top surface of the pressing post. A rear end surface of the pressing post is provided with a second receiving cavity. A second return spring is provided between the second receiving cavity and a rear inner side wall of the post hole.

Compared with the prior art, the invention provides a tamper-proof lifting device for a playard. The connector is connected to a straight handrail tube of the playard. When the connector needs to be lifted and lowered, the pressing post is first pressed backward, so that the pressing portion is separated from the extension plate. Then, the pulling member is pressed. The movable part is thus made to move to the left, so that the positioning post is separated from the currently cooperating limiting hole, and the connector is lifted or lowered. When the connector is lifted or lowered to a the desired position, the positioning post extends into an appropriate limiting hole. The pulling member and the pressing post return to their positions. To lift and lower the connector, the pressing post must be pressed first before the pulling member. Even if a child presses the pulling member by mistake, the connector will not rise or fall without the separation of the pressing portion from the extension plate. Therefore, the new device is tamper-proof and safer in use.

DETAILED DESCRIPTION OF THE EMBODIMENTS

Figure 1:
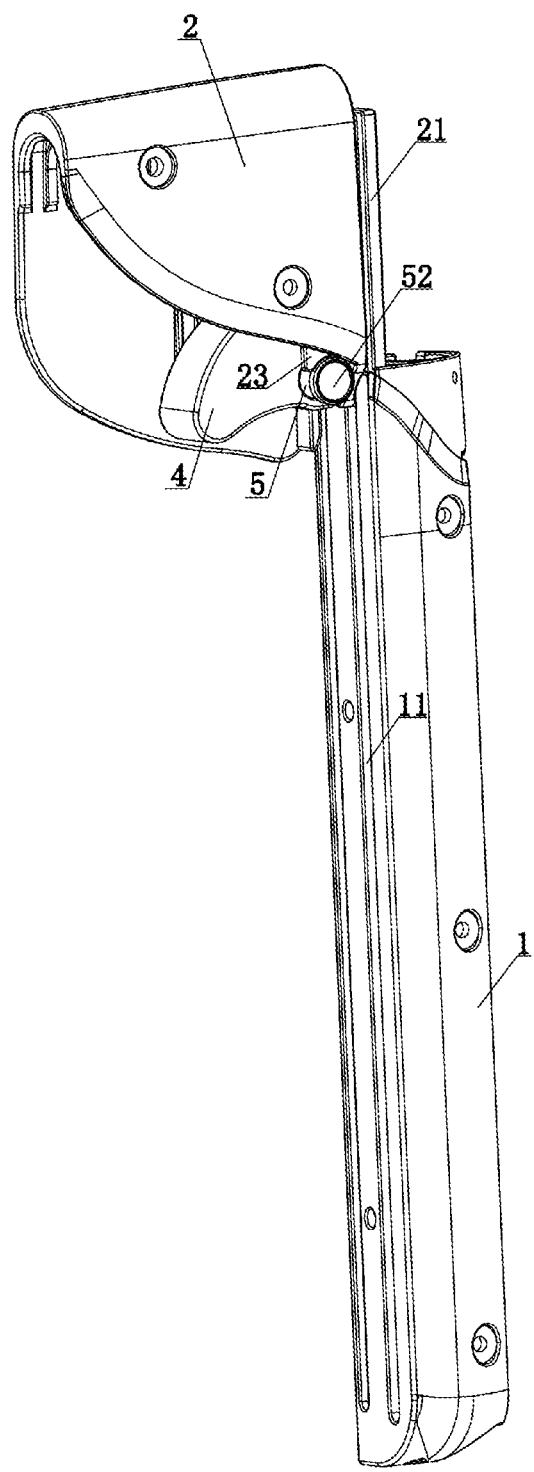
FIG. 1 is a structural diagram of the invention.
Figure 2:
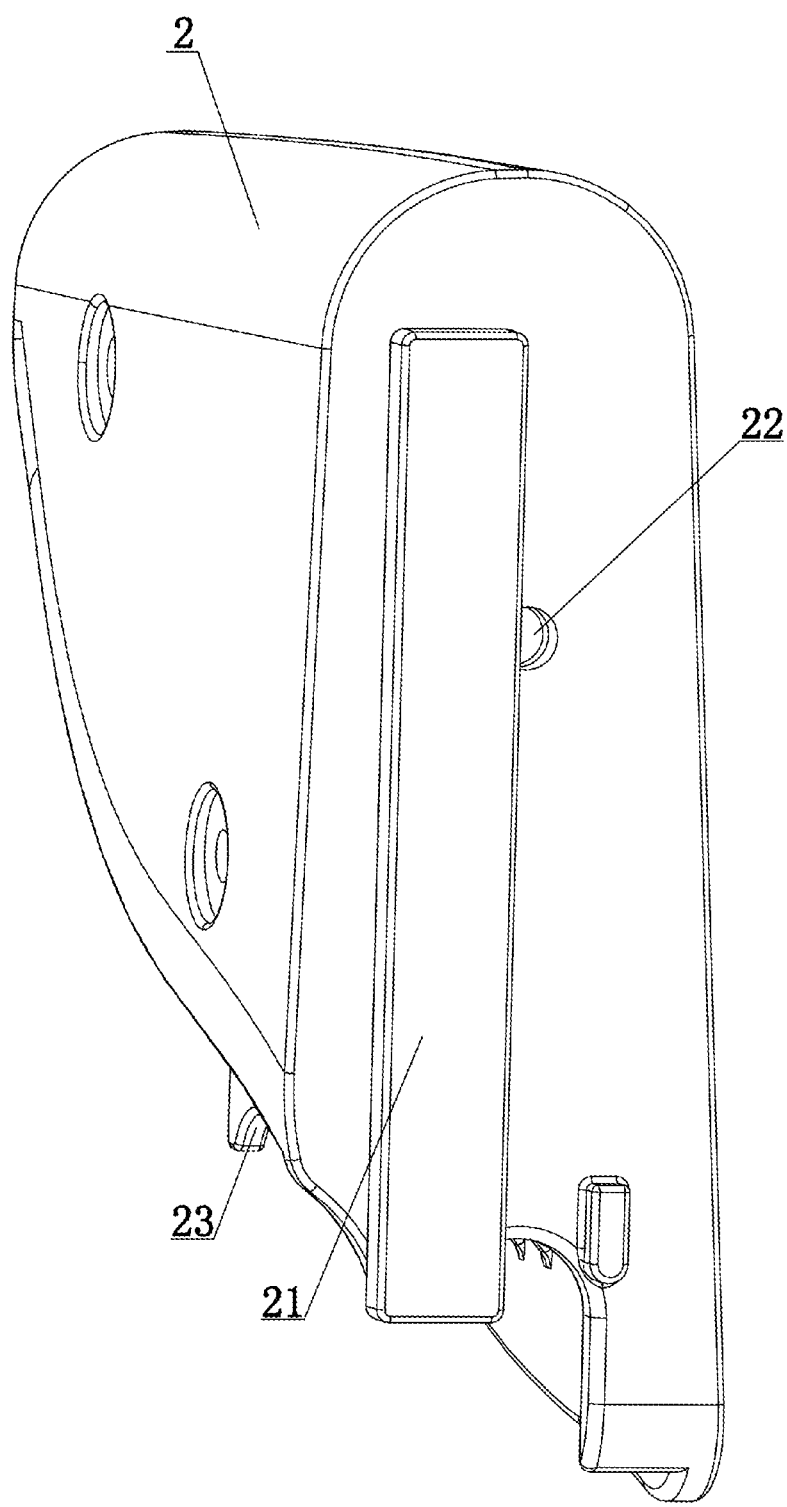
FIG. 2 is a structural diagram of a connector of the invention.

Referring to FIGS. 1 to 5, a lifting device for a playard includes the slide rail 1 and the connector 2, in which the slide groove 11 is provided on a left side of the slide rail 1. A slide portion 21 cooperating with the slide groove 11 is provided on a right side of the connector 2. The connector 2 is provided therein with the elastic movable part 3, which is adapted to be capable of moving left and right relative to the connector. The movable part 3 is in transmission connection with the pulling member 4. An upper part of the pulling member 4 is hinged with the connector 2. The positioning post 31 is fixed on a right end surface of the movable part 3. The positioning hole 22 for the positioning post 31 to pass through is provided on the right side of the connector 2. A plurality of upper and lower limiting holes 12 are provided on the left side of the slide rail 1. A front end surface of the pulling member 4 is provided with the post hole 41 extending backward. The post hole 41 is provided therein with an elastic pressing post 5 adapted to the post hole. A front end of the pressing post 5 extends out of the post hole 41. A top surface of the front end of the pressing post 5 is provided with the baffle 51. The pressing portion 52 is provided on the front end of the pressing post 5. The pressing portion 52 is located on a front side of the baffle 51, and an outer diameter of the pressing portion is greater than an outer diameter of the pressing post 5. A bottom surface of a front end of the connector 2 is provided with the downward extension plate 23. A bottom surface of the extension plate 23 is adapted to the pressing portion 52 to hold an upper part of the pressing portion 52. The baffle 51 is located on a rear side of the extension plate 23 and can abut against the extension plate 23.

Referring to FIGS. 1-7, the sleeve 6 is fixed in the connector 2. Front and rear parts of the sleeve 6 are respectively provided with the front engagement 61 and a rear engagement (not shown). The movable part 3 is located in the sleeve 6. Inner top and bottom surfaces of the sleeve 6 are provided with the first limiting grooves 62. Top and bottom surfaces of the movable part 3 are provided with the first limiting protrusions 32 cooperating with the corresponding first limiting grooves 62. A left end surface of the movable part 3 is provided with a first receiving cavity (not shown). The first return spring 7 is provided between the first receiving cavity and a left inner side of the sleeve 6; front and rear surfaces of the movable part 3 are respectively provided with a front stopper 33 and a rear stopper (not shown in the figures). Right end surfaces of the front stopper 33 and the rear stopper (not shown) are first inclined surfaces 34 inclined downward to the left. The upper part of the pulling member 4 is provided with the front pulling plate 42 and the rear pulling plate 43. Top surfaces of the front pulling plate 42 and the rear pulling plate 43 are second inclined surfaces 44 fitting with the first inclined surfaces 34. The top surfaces of the front pulling plate 42 and the rear pulling plate 43 can respectively abut against right end surfaces of the front engagement 61 and the rear engagement (not shown). The insert plate 63 is provided in the middle of a bottom surface of the sleeve 6 The slot 45 for inserting the insert plate 63 is provided in the middle of a top surface of the pulling member 4. The insert plate 63 is located between the front pulling plate 42 and the rear pulling plate 43. The front pulling plate 42 and the rear pulling plate 43 are provided with vertical grooves 46. The connector 2 is provided with a hinged shaft, which sequentially passes through the front end of the connector 2, the vertical groove 46 of the front pulling plate 42, the insert plate 63, the vertical groove 46 of the rear pulling plate 43 and a rear end of the connector 2.

Figure 3:
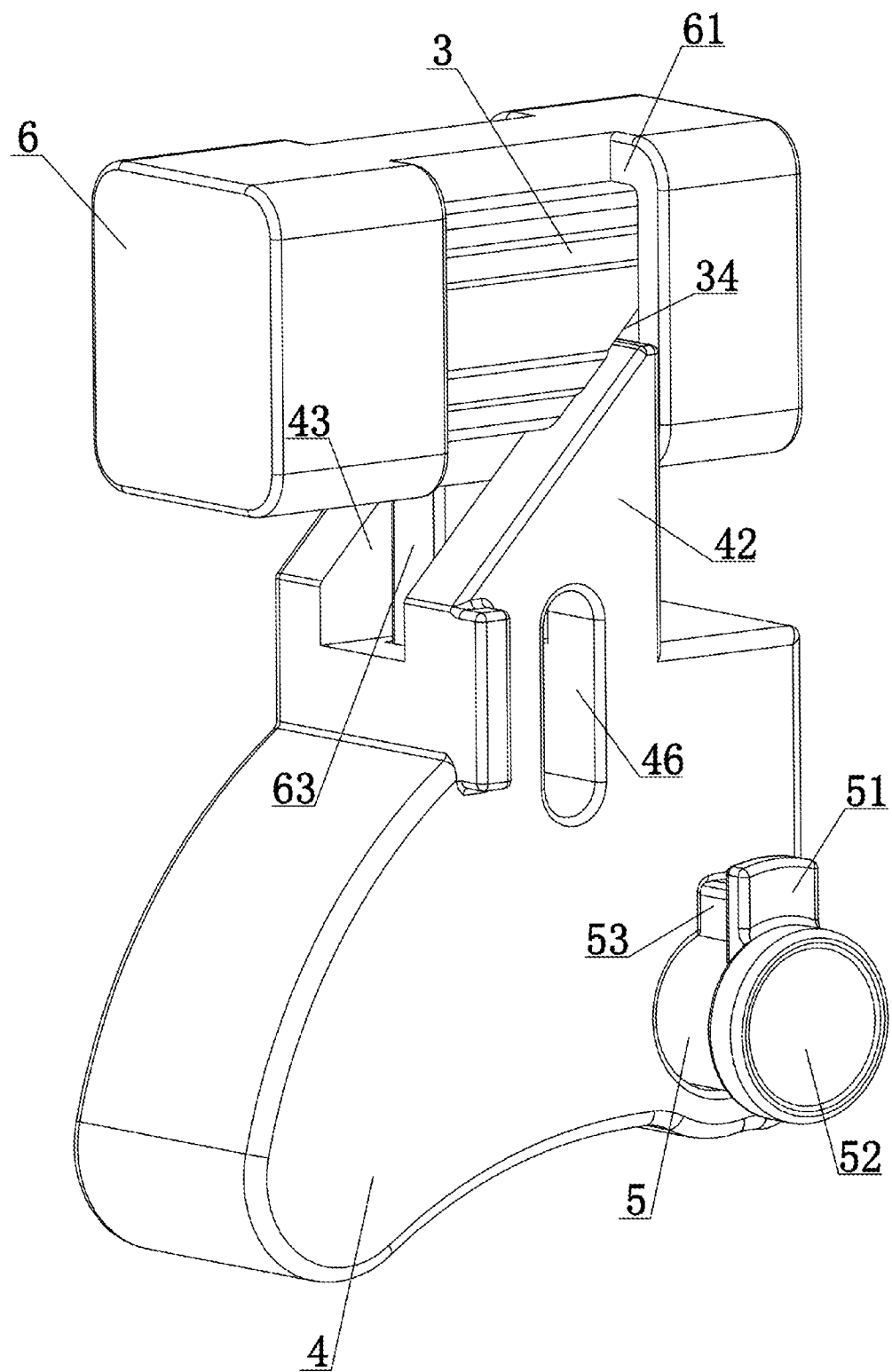
FIG. 3 is a structural diagram of the invention without a connector or a slide rail.
Figure 4:
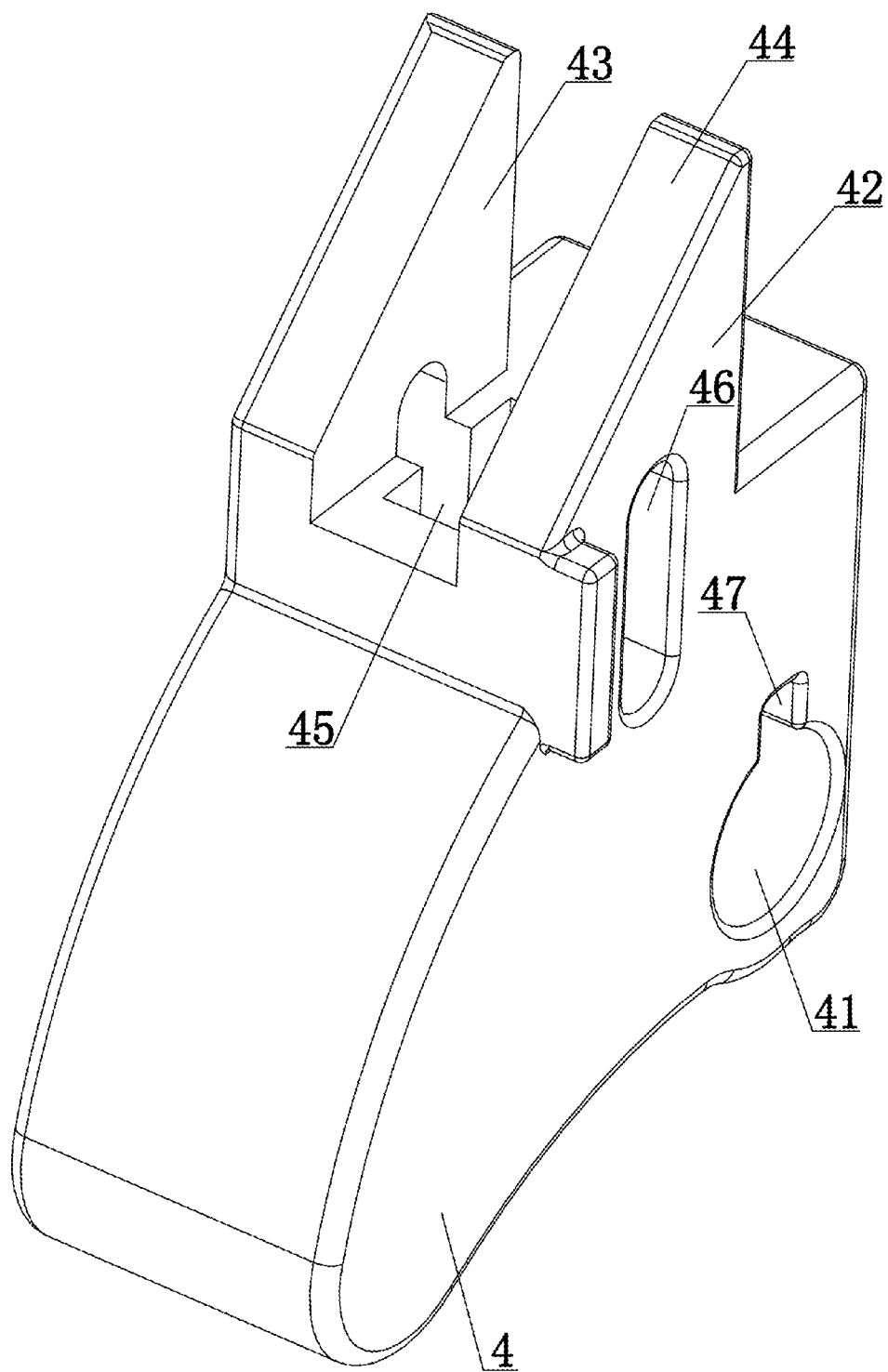
FIG. 4 is a structural diagram of a pulling member of the invention.
Figure 5:
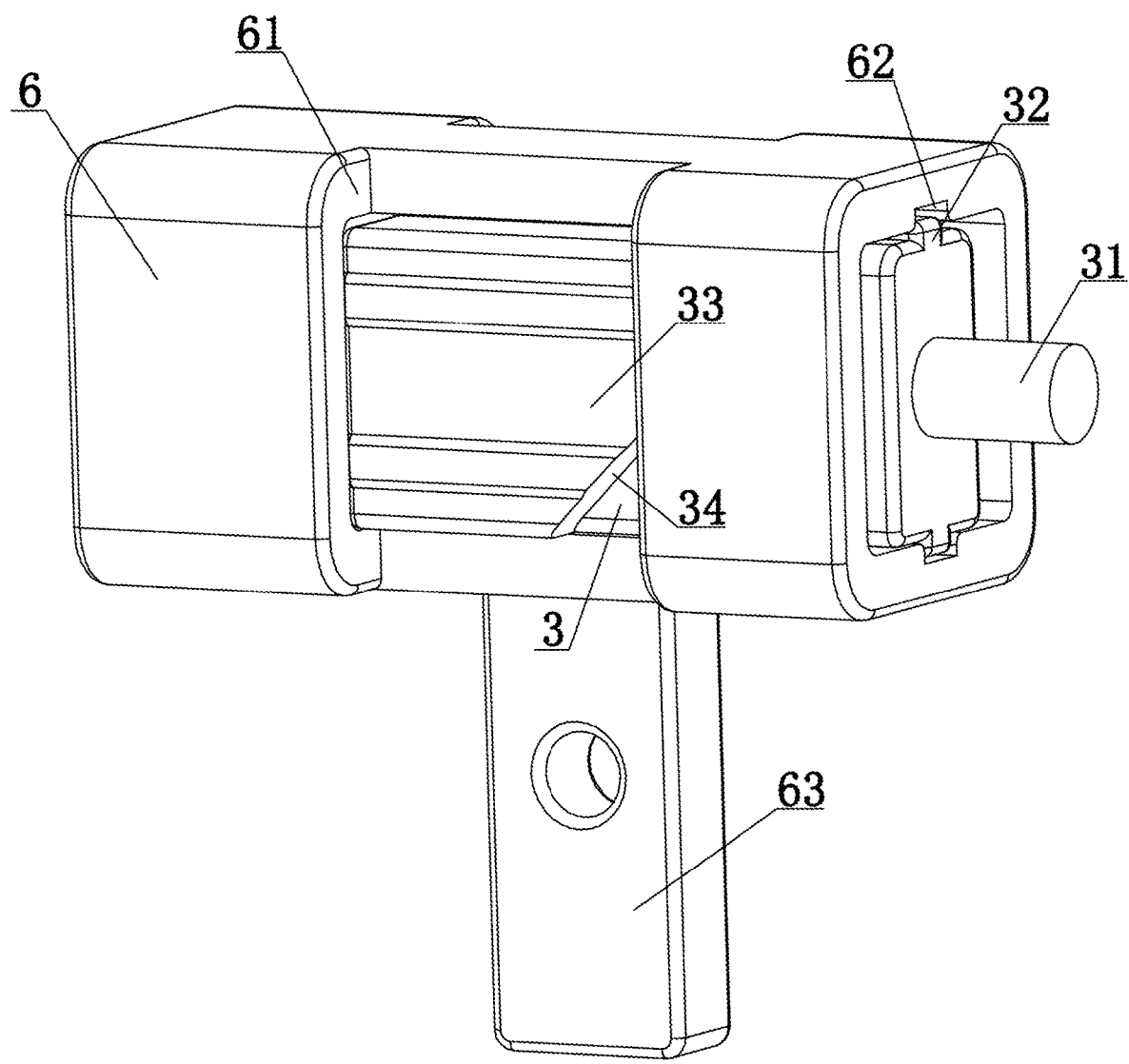
FIG. 5 is a structural diagram showing the connection of a sleeve and a movable part of the invention.
Figure 6:
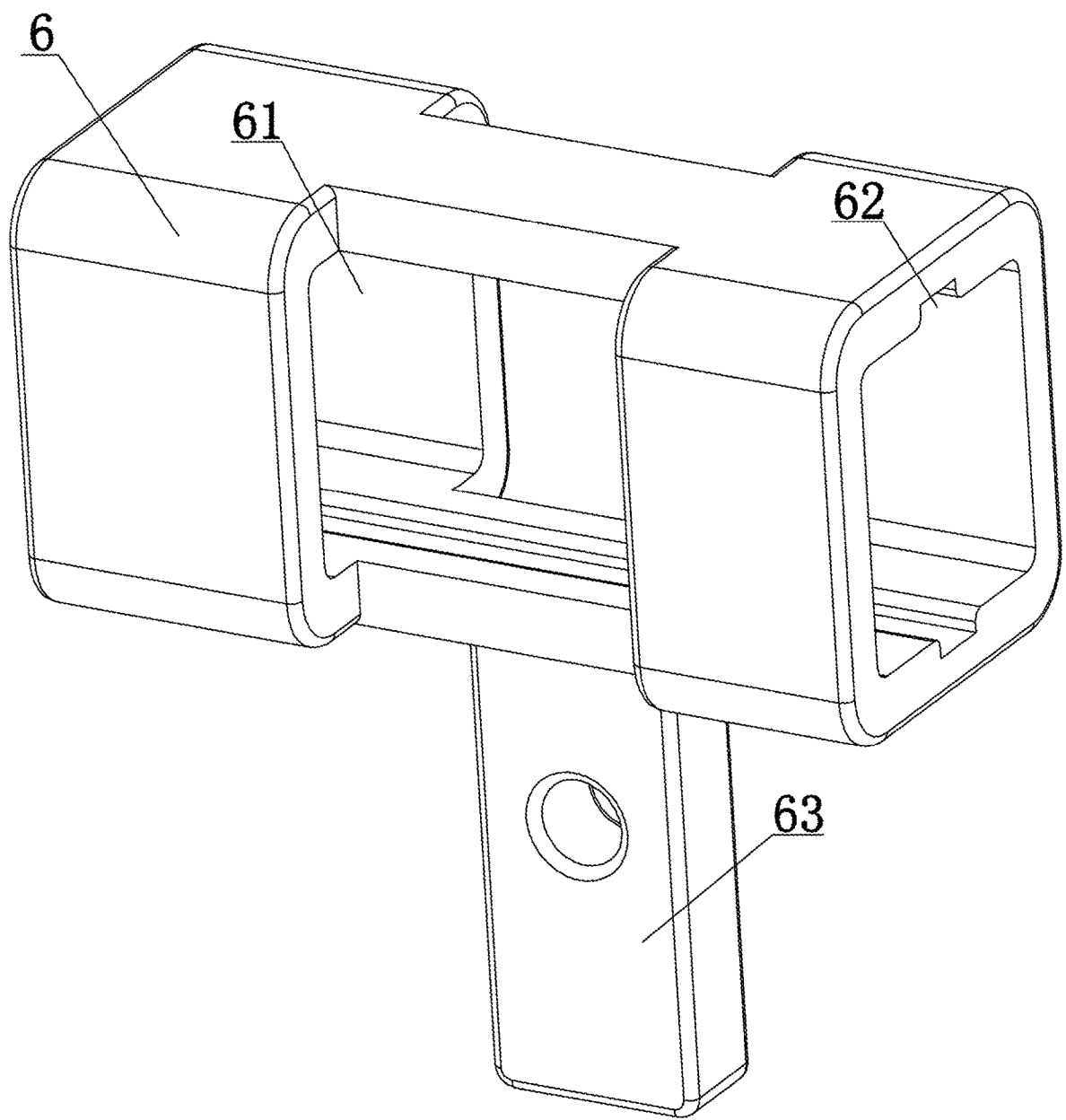
FIG. 6 is a structural diagram of a sleeve of the invention.
Figure 7:
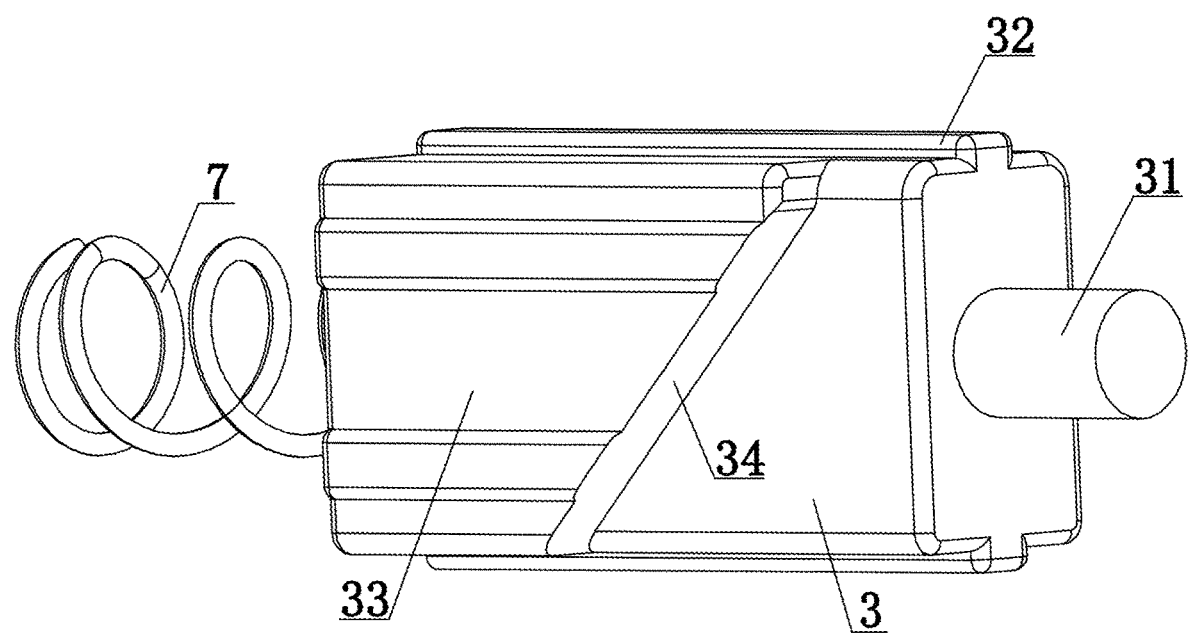
FIG. 7 is a structural diagram of a movable part of the invention.
Figure 8:
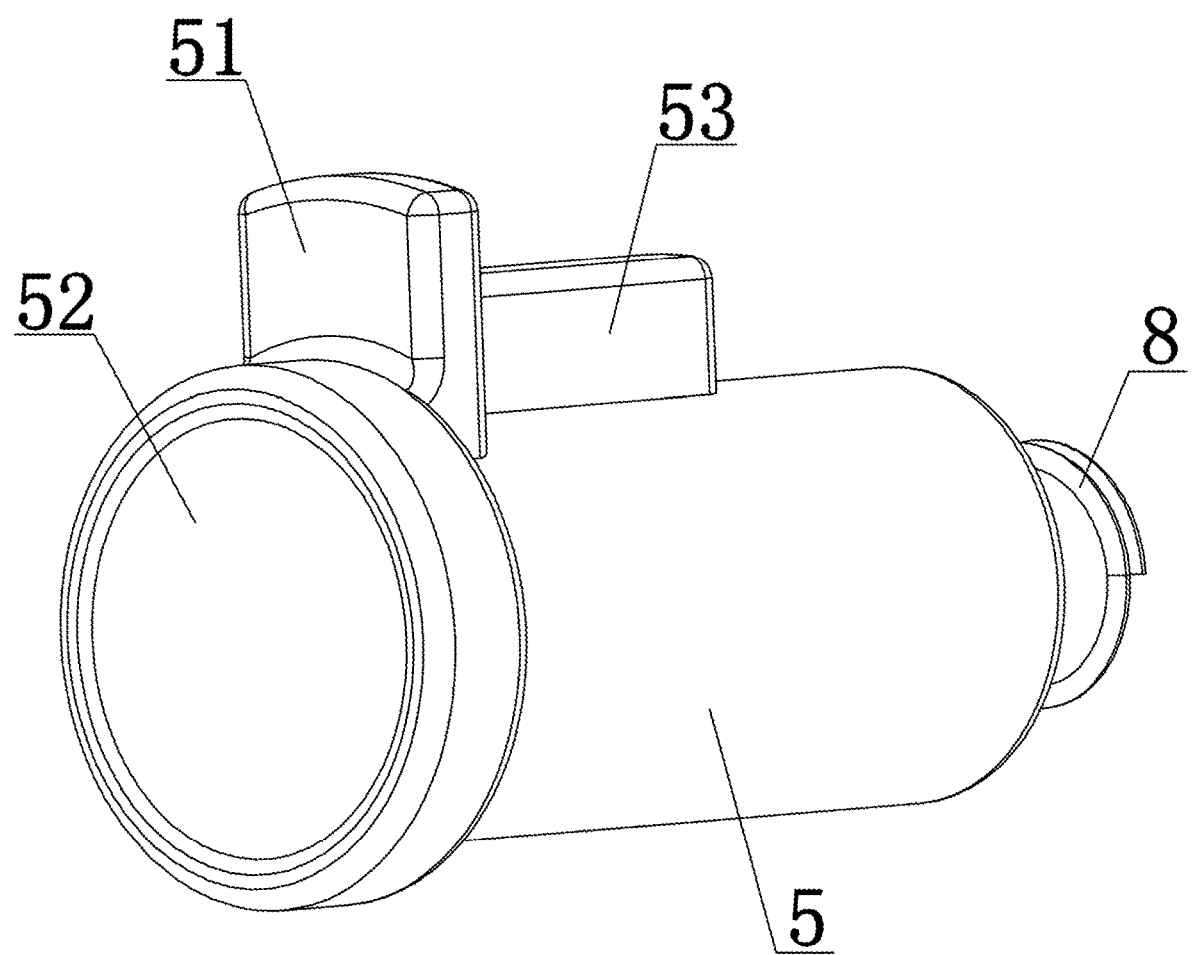
FIG. 8 is a structural diagram of a pressing post of the invention.

Referring to FIGS. 3, 4 and 8, the second limiting groove 47 communicating with the post hole 41 is provided above the post hole. The second limiting protrusion 53 cooperating with the second limiting groove 47 is provided on a top surface of the pressing post 5. A rear end surface of the pressing post 5 is provided with a second receiving cavity (not shown in figures) The second return spring 8 is provided between the second receiving cavity (not shown in figures) and a rear inner side wall of the post hole 41.

Referring to FIGS. 1-8, the connector 2 is connected to a straight handrail tube of the playard. When the connector 2 needs to be lifted and lowered, the pressing post 5 is first pressed backward, so that the pressing portion 52 is separated from the extension plate 23. Then, the pulling member 4 is pressed to cause the movable part 3 to move to the left, so that the positioning post 31 is separated from the currently cooperating limiting hole 12, and the connector 2 is lifted or lowered. When the connector 2 is lifted or lowered to the desired position, the positioning post 31 extends into the appropriate limiting hole 12. The pulling member 4 and the pressing post 5 return to their positions. To lift and lower the connector 2, the pressing post 5 must be pressed first before the pulling member 4. In the event that a child presses the pulling member 4 by mistake, the connector 2 will not rise or fall without the separation of the pressing portion 52 from the extension plate 23.

The above described are merely specific implementations of the present invention, but the design concept of the invention is not limited thereto. Any non-substantial changes made to the invention based on the concept of the invention should fall within the protection scope of the claims.

What is the claims is:

1. A lifting device for a playard, where the playard is mainly composed of a frame body and enclosures, the enclosures provide a safe space for a child to play and which can prevent the child from climbing out and falling, the lifting device comprising:

a slide rail and a connector, wherein a slide groove is provided on a left side of the slide rail; a slide portion cooperating with the slide groove is provided on a right side of the connector;

an elastic movable part is configured to move left and right relative to the connector and is provided inside the connector; the elastic movable part is in transmission connection with a pulling member; an upper part of the pulling member is hinged with the connector; a positioning post is fixed on a night end surface of the elastic movable part; a positioning hole for the positioning post to pass through is provided on the right side of the connector;

a plurality of upper and lower limiting holes are provided on the left side of the slide rail; a front end surface of the pulling member is provided with a post hole extending backward;

an elastic pressing post adapted to the post hole is provided inside the post hole; a front end of the elastic pressing post extends out of the post hole; a top surface of the front end of the elastic pressing post is provided with a baffle; a pressing portion is provided on the front end of the elastic pressing post; the pressing portion is located on a front side of the baffle, and an outer diameter of the pressing portion is greater than an outer diameter of the elastic pressing post;

a bottom surface of a front end of the connector is provided with a downward extension plate; a bottom surface of the extension plate is adapted to the pressing portion to hold an upper part of the pressing portion; and the baffle is located on a rear side of the extension plate and is configured to abut against the extension plate;

wherein the lifting device is configured such that when the connector needs to be lifted or lowered, the pressing post is first pressed backward, so that the pressing portion is separated from the extension plate, then, the pulling member is pressed such that the movable part is made to move to the left, so that the positioning post is separated from a currently cooperating limiting hole, so that the connector can be lifted or lowered in a tamper-proof manner.

2. The lifting device for the playard according to claim 1, wherein a sleeve is fixed in the connector; a front part and a rear part of the sleeve are respectively provided with a front engagement and a rear engagement; the elastic movable part is located in the sleeve;

an inner top surface and an inner bottom surface of the sleeve are provided with first limiting grooves; top and bottom surfaces of the elastic movable part are provided with first limiting protrusions cooperating with the first limiting grooves; the first limiting grooves correspond to the first limiting protrusions;

a left end surface of the elastic movable part is provided with a first receiving cavity; a first return spring is provided between the first receiving cavity and a left inner side of the sleeve;

a front end surface and a rear end surface of the elastic movable part are respectively provided with a front stopper and a rear stopper; right end surfaces of the front stopper and the rear stopper are first inclined surfaces inclined downward to a bottom left;

the upper part of the pulling member is provided with a front pulling plate and a rear pulling plate; top surfaces of the front pulling plate and the rear pulling plate are second inclined surfaces fitting with the first inclined surfaces; the top surfaces of the front pulling plate and the rear pulling plate respectively abut against right end surfaces of the front engagement and the rear engagement;

an insert plate is provided in a middle of a bottom surface of the sleeve; a slot for inserting the insert plate is provided in a middle of a top surface of the pulling member; the insert plate is located between the front pulling plate and the rear pulling plate; the front pulling plate and the rear pulling plate are provided with vertical grooves; and the connector is provided with a hinged shaft, and the hinged shaft sequentially passes through the front end of the connector, the vertical groove of the front pulling plate, the insert plate, the vertical groove of the rear pulling plate and a rear end of the connector.

3. The lifting device for the playard according to claim 1, wherein a second limiting groove communicating with the post hole is provided above the post hole; a second limiting protrusion cooperating with the second limiting groove is provided on a top surface of the elastic pressing post; a rear end surface of the elastic pressing post is provided with a second receiving cavity; and a second return spring is provided between the second receiving cavity and a rear inner side wall of the post hole.

* * * * *